United States Patent [19]
Nichols

[11] Patent Number: 6,050,243
[45] Date of Patent: Apr. 18, 2000

[54] INTERNAL COMBUSTION ENGINE CONTROL

[75] Inventor: Gary Arthur Nichols, Farmington Hills, Mich.

[73] Assignee: General Motors Corporation, Detroit, Mich.

[21] Appl. No.: 09/118,266

[22] Filed: Jul. 17, 1998

[51] Int. Cl.[7] .................................................. F02M 51/00
[52] U.S. Cl. ........................... 123/479; 123/690; 701/107
[58] Field of Search .................... 123/399, 479, 123/490, 478, 198 D, 690, 491; 701/104, 107

[56] References Cited

U.S. PATENT DOCUMENTS

| | | | |
|---|---|---|---|
| 3,566,846 | 3/1971 | Glockler | 123/491 |
| 4,208,991 | 6/1980 | Reddy | 123/491 |
| 4,244,050 | 1/1981 | Weber et al. | 364/431 |
| 4,245,315 | 1/1981 | Barman et al. | 361/431 |
| 4,414,949 | 11/1983 | Honig et al. | 123/479 |
| 4,467,762 | 8/1984 | Fischer et al. | 123/198 D |
| 4,531,190 | 7/1985 | Drews et al. | 123/479 |
| 4,631,628 | 12/1986 | Kissel | 123/490 |
| 4,785,771 | 11/1988 | Ibuki et al. | 123/479 |
| 5,056,484 | 10/1991 | Denz et al. | 123/399 |
| 5,076,238 | 12/1991 | Rosenau et al. | 123/491 |

*Primary Examiner*—Erick R. Solis
*Attorney, Agent, or Firm*—Vincent A. Cishosz

[57] ABSTRACT

Internal combustion engine air/fuel ratio control responsive to low voltage operating conditions of an electrical system maintains stable, precise air/fuel ratio conditions under electrical system fault conditions affecting operation of fuel control components including fuel pumps, fuel injectors, and drivers therefor. Electrical system operating voltage is monitored and when a voltage drop below a voltage threshold associated with reliable engine cylinder air/fuel ratio control is diagnosed, the air/fuel ratio smoothly transitions to a reduced engine performance operating mode which, at least for high engine output power requests, limits fueling and airflow to the engine cylinders to a level that may be accurately, reliably supported by the fuel control system components under their reduced electric drive signals. The reduced performance operating mode is maintained while the fault condition persists.

6 Claims, 3 Drawing Sheets ing conditions associated with substantially reduced engine output power and stability or reduced catalytic treatment device efficiency. The engine is controlled in the limited performance mode while the monitored power level remains below the threshold power level.

INTERNAL COMBUSTION ENGINE CONTROL

TECHNICAL FIELD

This invention relates to internal combustion engine control and, more particularly, to control of engine output power under low voltage engine operating conditions.

BACKGROUND OF THE INVENTION

Electronic fuel injected internal combustion engines typically must maintain a minimum electrical power level to accurately deliver fuel to engine cylinders under high engine load operating conditions. In the event of a drop in engine control system electrical power, such as may be caused by a fault condition in an electric generator, fueling capacity reductions may occur, for example caused by a reduced operating level of popular electric fuel pumps the output of which varies with operating voltage, leading to lean cylinder air/fuel ratio conditions when high engine output power is demanded. Under high fuel flow conditions corresponding to high engine output power demands, an electric fuel pump that is operating under reduced drive voltage, may not be able to maintain fuel pressure within an acceptable pressure range. For example, the fuel pressure may drop by an order of magnitude or more, resulting in less fuel delivered to engine cylinders for given fuel injection commands, and lean air/fuel ratio conditions in engine cylinders. The lean air/fuel ratio conditions may reduce combustion quality in the engine, leading to potentially unpredictable loss of engine power. Under such conditions, unburned fuel may pass through the engine to catalytic treatment devices in the engine exhaust system and may damage the treatment devices, reducing their efficiency and adding to engine operating costs.

Conventional treatment of electrical system power reduction fault conditions takes the form of increasing engine speed to increase operating levels of electric generators. Such treatment does not address certain fault conditions in which the electric generator, or other electric system components have failed in such a manner that they are no longer responsive to increased engine speeds.

It would therefore be desirable to provide for engine control responsive to a loss of electric system power to preserve engine air/fuel ratio control precision and to ensure an adequate stable engine output with an air/fuel ratio supportive of efficient operation of catalytic treatment devices.

SUMMARY OF THE INVENTION

The present invention is directed to engine control responsive to a reduced electrical system power level to provide for stable engine operation protective of catalytic treatment device efficiency.

More specifically, in accordance with an aspect of this invention, the electrical system operating voltage (or power level) of an automotive vehicle is monitored during an engine operating cycle. A threshold operating voltage representing the minimum voltage that can be associated with stable, precise engine air/fuel ratio control is established. If the monitored operating voltage drops below the established threshold operating voltage, engine controls are transitioned to a limited (or reduced) performance mode which limits the maximum amount of engine output power that can be commanded by an engine operator or by other engine control operations. The limited performance mode is established to avoid certain lean air/fuel ratio operating conditions associated with substantially reduced engine output power and stability or reduced catalytic treatment device efficiency. The engine is controlled in the limited performance mode while the monitored power level remains below the threshold power level.

In accord with yet a further aspect of this invention, a minimum operating voltage (or power level) is established as substantially the lowest electrical operating voltage of the electrical system at which operation in the limited performance mode may reliably be maintained. If the monitored operating voltage is determined to drop below the minimum operating voltage, engine control transitions to a minimum performance mode. The minimum performance mode provides for a minimum engine performance sufficient to provide basic vehicle mobility and below a performance level that may lead to unreliable engine operation or inefficient catalytic treatment device efficiency. The minimum performance mode is maintained while the monitored electrical power level remains below the minimum power level.

In accord with yet a further aspect of this invention, additional performance modes may be provided with corresponding operating voltages (or power levels) whereby the highest level of engine performance may be maintained for a given electrical system operating voltage without loss in stability of engine output power or catalytic treatment device efficiency.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
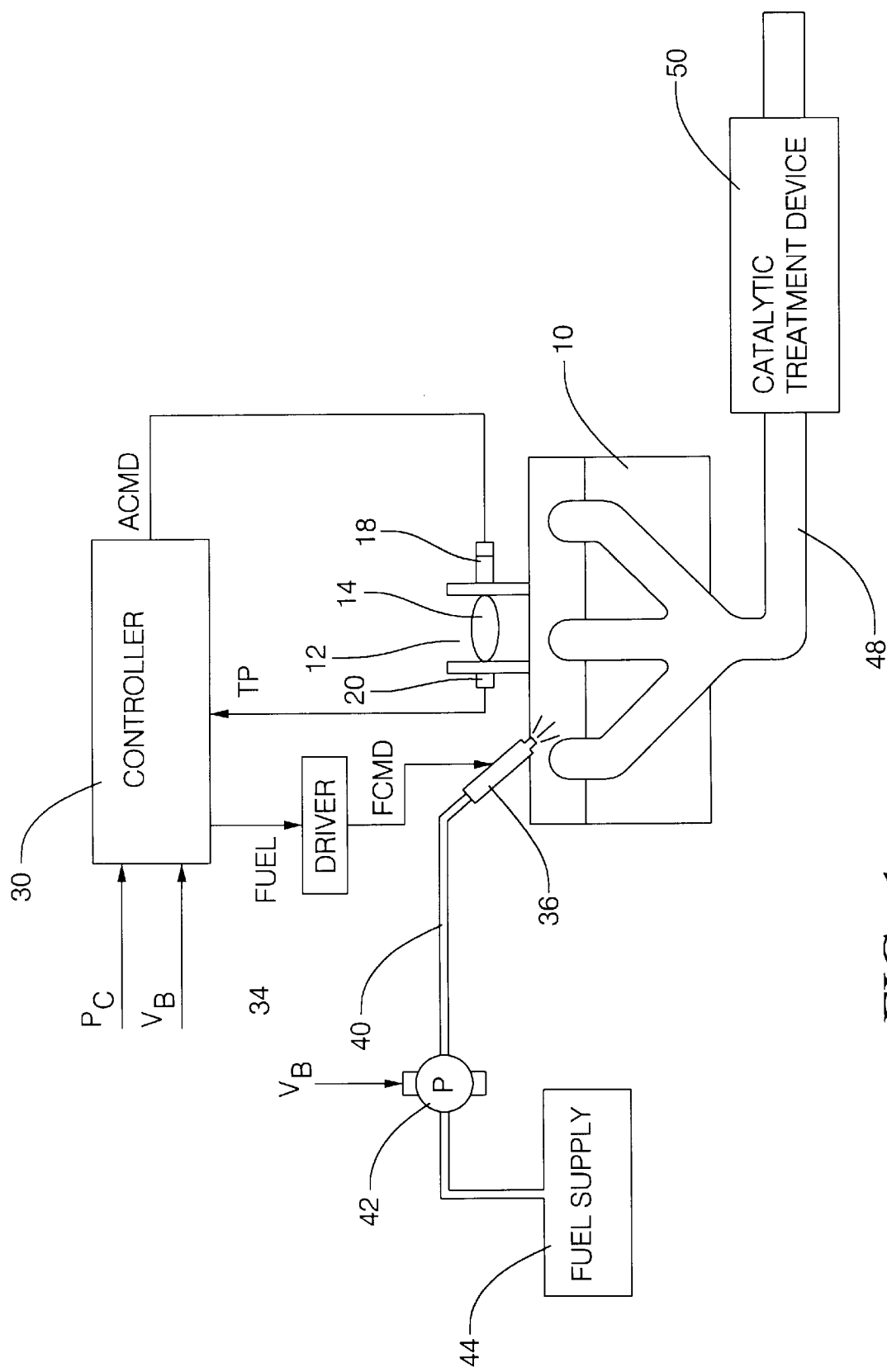
FIG. 1 is a general diagram of an internal combustion engine system in which the principles of this invention are carried out in accordance with the preferred embodiment.

Referring to FIG. 1, an internal combustion engine 10 receives intake air through an intake passage 12 in which is rotatably disposed a conventional intake air valve 14 of the butterfly or rotary type. The valve 14 is coupled via a shaft (not shown) to a conventional actuator 18, such as of the DC brush motor type, the actuator being driven to a desired rotational position by drive signal Acmd issued from conventional drive circuitry (not shown) integrated within conventional controller 30. The rotational position of the actuator generates, such as through a conventional gearset (not shown) between the actuator and the valve 14, a corresponding rotational position of the valve 14, which provides for a corresponding degree of restriction of airflow through the passage 12 and to cylinders (not shown) of the engine 10 for combination with an injected fuel mass from one or more fuel injectors, generally represented as injector 36.

The injector 36 is of any suitable conventional type, and receives pressurized fuel from a fueling system including a fuel pump 42 and admits the pressurized fuel to cylinders or cylinder intake runners of the engine 10 while the fuel injector is driven to an open position by drive signal Fcmd from a conventional fuel injector driver 34. The fuel injector driver receives a control signal FUEL from the controller 30 indicating the duration of the fuel injection event and issues command Fcmd in response thereto to the fuel injector to drive the injector to an open position for the duration of the event, as is well established in the art. The fuel pump 42 receives fuel from a fuel supply 44 and drives the fuel under pressure to the fuel injection system including injectors such as injector 36. The fuel pump 42, as well as other generally known fuel control components of the engine including fuel injector 36 and the fuel injector driver 34, are driven by one or more electrical drive signals from a vehicle electrical system (not shown), with a supply voltage Vb representative of the operating voltage of the electrical drive signals. The operating level of the pump 42 and of the fuel control components is dictated by the magnitude of Vb. Accordingly, in the event the drive voltage of the electrical system as indicated by Vb drops, the power available to drive the fuel pump (and other fuel control components) drops, which may reduce the pressure of the fuel delivered to the injectors, reducing the fuel mass entering the cylinder for a given injection event. The reduction in fuel mass enleans the air/fuel charge within engine cylinders (not shown), reducing unpredictably engine performance, and potentially damaging catalytic treatment device 50.

Fuel passing to engine cylinders is combined with the air passing through the intake passage 12 for consumption in the cylinders, the consumption producing combustion gasses which exit the cylinders through an exhaust conduit 48 and to catalytic treatment device 50 for treatment thereof. The efficiency in treating the various exhaust gas constituent elements is reduced as the air/fuel ratio delivered for consumption in engine cylinders moves away from the generally known stoichiometric ratio. For substantial departures away from stoichiometry, engine performance may deteriorate. The deterioration may be inconsistent. For sustained air/fuel ratios that are substantially lean of stoichiometry, the catalytic treatment device may be permanently damaged.

The controller 30 is of any suitable conventional type, for example including a main central processing unit for handling engine management functions and a checking central processing unit for controlling the position of the valve 14. The controller 30 receives several well-known inputs from sensors and systems associated with the engine 10, such as sensors and systems throughout an automotive vehicle in which the engine operates and including signal Vb indicating the operating voltage of the electrical system (not shown), signal Pc indicating a current desired operating level of the engine as manually provided by an engine operator through an accelerator pedal (not shown), and signal TP indicating current actual position of valve 14, such as from a conventional potentiometric position sensor 20, which may be of a conventional redundant form, coupled to the valve 14.

Figure 2:
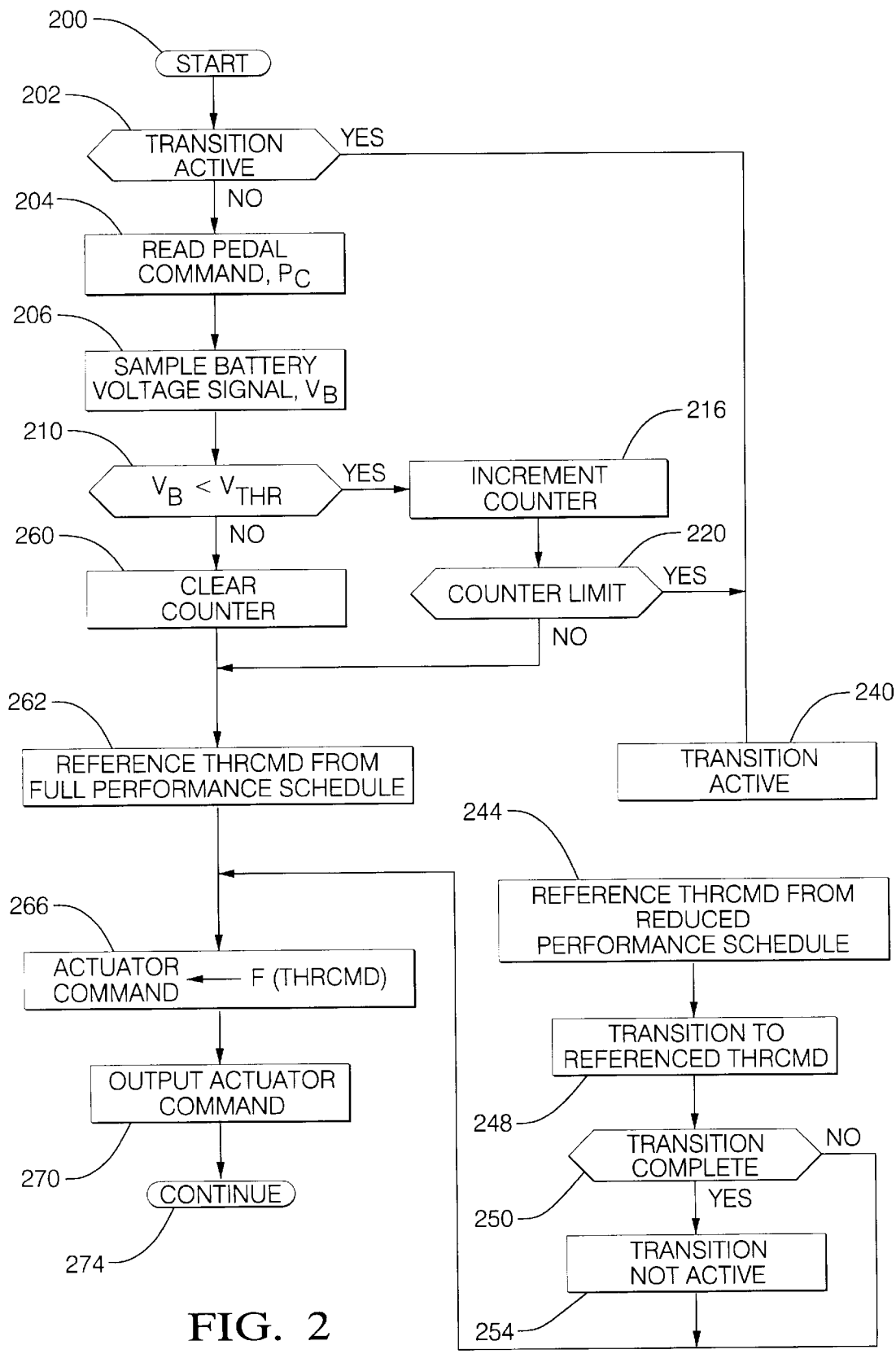
FIG. 2 is a computer flow diagram illustrating a sequence of operations for carrying out the principles of the preferred embodiment of this invention with the internal combustion engine system of FIG. 1.

The controller 30 periodically references or samples the input signals, processes the signals and, through execution of a sequence of operations in the form of software instructions, generates control, diagnostic, and maintenance commands which are periodically output to corresponding actuators, systems, and devices as is generally known in the art. Specifically, in this embodiment, in addition to various conventional control, diagnostic, and maintenance operations, the operations of FIG. 2 are periodically carried out by the controller on a time-based schedule. For example, approximately every 15.6 milliseconds during an engine ignition cycle, the operations of FIG. 2, in the form of a sequence of software instructions stored in non-volatile memory (not shown) within the controller 30, are carried out starting at a step 200. The operations provide for monitoring of the electrical system and reduction of engine output power when the electric system operating level is reduced to a point that the fuel pump or other accessories cannot support precise, robust engine cylinder air/fuel control.

More specifically, when executed, the operations of FIG. 2 proceed from the step 200 to check a transition flag, stored in controller memory at a step 202. If the flag indicates a transition, to be described, is active, then a next step 240, to be described, is carried out. If the flag indicates that no transition is active, the pedal command Pc indicating a manual power command from the engine operator, as described, is next read at a step 204. Next, the battery voltage Vb indicating the operating voltage of the engine electrical system, as described, is next sampled at a step 206. The sampled battery voltage is next compared to a threshold voltage Vthr, set to approximately eight volts in this embodiment, at a next step 210. Vthr should be set through a conventional calibration procedure as the lowest voltage at which the electrical system of the engine 10 can support accurate, robust engine air/fuel ratio control.

If Vb is less than Vthr as determined at the step 210, a reduced performance operating mode may be required, and a counter is incremented at a next step 216. The counter is reset to zero at engine startup. The current value of the counter is next compared to a count limit, set to 320, representing five seconds of duration with a reduced battery voltage, at a next step 220. The count limit should be calibrated through a conventional calibration process as the amount of time under a low voltage operating condition required to be reasonably assured of a persistent fault condition in the vehicle electrical system requiring air/fuel ratio control compensation. If the counter exceeds the limit at the step 220, then a transition from a full performance operating mode to a limited performance operating mode is required to stabilize engine air/fuel ratio control and to protect the catalytic treatment device, in accord with an important aspect of this invention. The transition is provided for by proceeding to set the transition active flag in controller memory at the step 240, and then to reference a throttle command THRCMD for controlling the position of the valve 14 (FIG. 1) from a reduced performance schedule at a next step 244.

Figure 3:
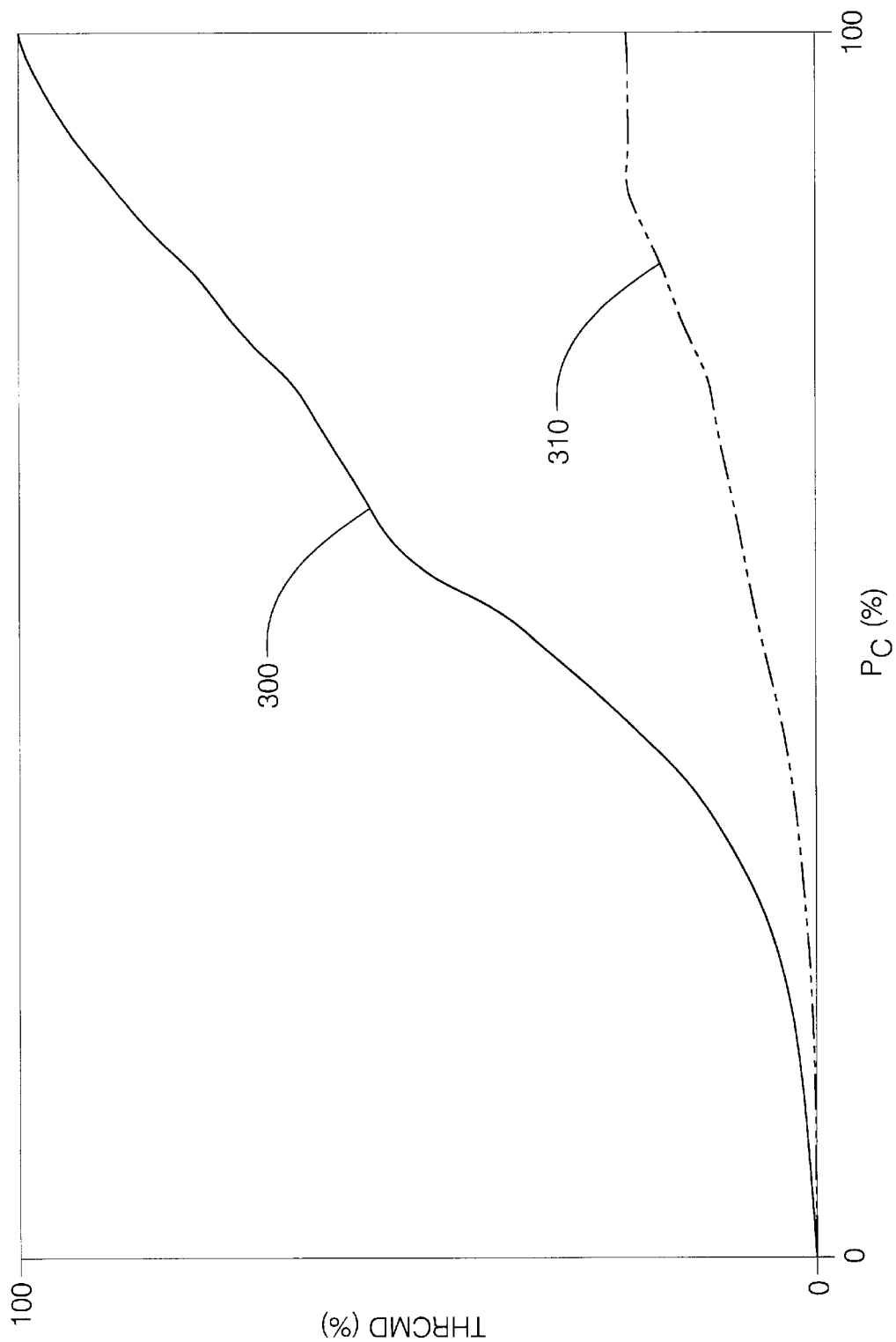
FIG. 3 is a graphical diagram of parameters applied in the sequence of operations of FIG. 2.

Curve 310 of FIG. 3 generally illustrates a representative reduced performance schedule of THRCMD commands, expressed as a percentage of an overall THRCMD range, as a function of command Pc for this embodiment. Curve 300 of FIG. 3 illustrates a representative full performance THRCMD schedule. Curve 300 may be provided as any suitable conventional calibrated relationship between Pc (or a desired position of valve 14 of FIG. 1) and THRCMD (or the actual valve command). Curve 310 may then be determined through a conventional calibration procedure as a schedule of THRCMD values below the values of curve 300 that, for each desired engine operating level, as indicated by signal Pc, support precise, robust engine air/fuel ratio control under low electrical system operating voltage conditions.

The inventors intend that other approaches to limiting engine output power in response to persistent low electrical system operating voltage conditions may be provided for within the scope of this invention, including adding one or more additional performance schedules to FIG. 3 for various levels of reduced electrical system operating voltages, including, for example, a minimum performance schedule when Vb is extremely low which provides for a minimum value of THRCMD, such as just enough of an opening of the valve 14 of FIG. 1 to allow for a generally-known high idle operating condition of the engine 10 (FIG. 1) for any Pc that is received. Any additional schedule may be implemented in the manner set forth in described steps 210–244.

Still further, the inventors intend that the reduction in engine performance in response to a low Vb condition may be implemented by applying a reduction factor or offset to the curve 300 of FIG. 3, wherein the reduction factor or offset is determined as a function of the difference between Vb and a predetermined "normal" Vb value, such as the described threshold value Vthr. The curves 300 and 310, and any additional curves that may be added within the scope of this invention, may be implemented as a schedule of paired values stored in non-volatile memory of the controller 30 of FIG. 1. More specifically, the full performance curve 300 may be implemented by storing a series of Pc values with their corresponding THRCMD values from the curve 300, and then by referencing, through a standard interpolation process for a given Pc value, the corresponding THRCMD value from the stored pairs. The reduced performance curve 310, and any additional curves may be stored in a like manner.

Returning to FIG. 2, after referencing THRCMD at the step 244, a transition process is carried out at a next step 248 to smoothly transition from a current position of the valve 14 (FIG. 1) to the position corresponding to the THRCMD referenced at the step 244. For example, a weighted average of THRCMD and a most recent prior valve position may be applied as a current valve position command to gradually drive the valve 14 from its current position to the reduced performance position with minimum disruption to the engine operator. Other approaches, including classical control theory-based approaches, may be applied to efficiently drive to the reduced performance valve position determined at the step 244 within the scope of this invention.

Following the step 248, a determination is made at a step 250 of whether the transition is complete. The transition is complete when the reduced performance position determined at the step 244 is reached, for example as indicated by a sampled value of signal TP of FIG. 1, indicating the current position of the valve 14 of FIG. 1 corresponds to the position determined at the step 244. If the transition is complete, the flag indicating a active transition is cleared at a next step 254. Following the step 254, or if the transition was determined to not be complete at the step 250, a command signal Acmd for controlling the position of the actuator 18 of FIG. 1 to the position generated at the steps 244 and 248, is next determined as a function of THRCMD at a step 266, in any suitable conventional manner. The actuator command is next output at a step 270 to the actuator 18 to provide for positioning of the valve 14 in accordance with the reduced engine output performance mode, whereby stable, accurate engine cylinder air/fuel ratio control will be provided despite reduced electrical system operating voltage, in accord with an important aspect of this invention. Following the step 270, any suitable conventional control, diagnostic, or maintenance operations continue to be carried out as represented by step 274, including fuel control operations to drive fuel injector 36 (FIG. 1) to deliver fuel to engine cylinders or cylinder intake runners which, when combined with the air mass passing to the cylinders, provides for precise air/fuel ratio control.

Returning to step 210, if Vb is not less than Vthr, a reduced operating voltage is not present, and the counter is cleared at a next step 260 to prepare for any subsequent low voltage conditions. Next, or if the counter is determined to not exceed the count limit at the described step 220, THRCMD is referenced from the full performance schedule corresponding, in this embodiment, to curve 300 of FIG. 3, at a next step 262. The referenced THRCMD provides for full performance operation of the engine control system, as the engine electrical system is assumed to be operating in a manner supporting accurate air/fuel ratio control under full performance operation.

Following the step 262, steps 266–274 are carried out in the described manner but using the full performance THRCMD value referenced at the step 262, and not the reduced performance THRCMD value referenced at the step 244.

The inventors intend that other approaches to limiting engine performance under reduced electrical system operating voltage conditions may be provided within the scope of this invention, including limiting fueling to a level that may be precisely controlled and then limiting airflow as well, whereby a lower level of engine output power is provided, but accuracy in air/fuel ratio control is preserved, to maintain engine stability and to protect the catalytic treatment device 50 of FIG. 1. Still further, the engine performance may be limited under reduced electrical system operating voltage conditions only when high engine output power is requested, such as by a vehicle operator through an accelerator pedal or by automatic power control systems generally known in the art. Such performance limiting may be provided for by only transitioning to the curve 310 under high load operating conditions, or by developing the curve 310 to only differ from the curve 300 (FIG. 3) for high fuel flow conditions, such as for high Pc values.

The preferred embodiment is not intended to limit or restrict the invention since many modifications may be made through the exercise of ordinary skill in the art without departing from the scope of the invention.

The embodiments of the invention in which a property or privilege is claimed are described as follows.

What is claimed is:

1. A method for controlling output power of an internal combustion engine under reduced electric power conditions of an electrical system, the electrical system having a battery with an output voltage and the internal combustion engine having fuel control components responsive to an electric drive signal from the electrical system, comprising the steps of:

providing an engine control command for operating the engine at a desired output power level;

providing a threshold battery voltage level;

providing a minimum battery voltage level substantially below the threshold battery voltage level;

sampling battery output voltage level;

comparing the sampled battery output voltage level with the provided threshold battery voltage level;

identifying a reduced electric power condition when the sampled battery output voltage level is less than the provided threshold battery voltage level;

determining a reduced engine control command for operating the engine at a reduced power level relative to the desired power level while the reduced electric power condition is identified;

comparing the sampled battery output voltage level with the minimum battery output voltage level;

identifying a minimum electric power condition when the sampled battery output voltage level is less than the minimum battery output voltage level; and determining a minimum engine control command for operating the engine at a minimum power level relative to the desired power level while the minimum electric power condition is identified.

2. The method of claim 1, further comprising the step of:

adjusting the reduced engine control command as a function of the sampled battery output voltage level upon identifying the reduced electric power condition.

3. A method for controlling fuel and air admitted to cylinders of an internal combustion engine under reduced voltage operating conditions of an electrical system that provides electric drive signals to fuel control components for delivering fuel to the cylinders, comprising the steps of:

referencing at least one of a desired cylinder fueling level and a desired cylinder inlet air level;

providing a full performance function for generating at least one of a fuel command from the desired cylinder fueling level and an air command from the desired cylinder inlet air level;

providing a reduced performance function for generating at least one of a fuel command from the desired cylinder fueling level and an air command from the desired cylinder inlet air level;

providing a minimum performance function for generating at least one of a fuel command from the desired cylinder fueling level and an air command from the desired cylinder inlet air level;

diagnosing the voltage operating condition of the electrical system;

generating at least one of a fuel command and an air command from the provided reduced performance function upon diagnosing a reduced voltage operating condition;

generating at least one of a fuel command and an air command from the provided minimum performance function upon diagnosing a minimum voltage operating condition, where the minimum voltage operating condition is less than the reduced voltage operating condition;

generating at least one of a fuel command and an air command from the provided full performance function when the reduced voltage operating condition or the minimum voltage operating condition is not diagnosed; and controlling at least one of fuel and air admitted to the cylinders in accordance with the generated command.

4. The method of claim 3, wherein the diagnosing step further comprises the steps of:

sampling a voltage signal level representative of the electrical system operating voltage;

providing a voltage level threshold representing the minimum electrical system operating voltage supporting reliable, accurate operation of the fuel control components;

comparing the sampled voltage signal level to the voltage level threshold; and diagnosing the reduced voltage operating condition when the sampled voltage signal level is less than the voltage level threshold.

5. The method of claim 4, further comprising the step of:

upon diagnosing the reduced voltage operating condition, varying the reduced performance function as a function of the sampled voltage signal level.

6. A method for controlling output power of an internal combustion engine under reduced electric power conditions of an electrical system, the internal combustion engine having fuel control components responsive to an electric drive signal from the electrical system, comprising the steps of:

providing an engine control command for operating the engine at a desired output power level;

diagnosing an electrical power condition of the electrical system;

determining a reduced engine control command for operating the engine at a reduced power level relative to the desired power level upon diagnosing a reduced voltage operating condition;

determining a minimum engine control command for operating the engine at a minimum power level relative to the desired power level upon diagnosing a minimum voltage operating condition, where the minimum voltage operating condition is less than the reduced voltage operating condition; and determining a full performance engine control command for operating the engine at the desired output power level when neither the reduced voltage operating condition or the minimum voltage operating condition are not diagnosed.

* * * * *